Nov. 19, 1968

R. M. SULLIVAN 3,412,189

APPARATUS AND PROCESS FOR USE IN THE EXPANSION
OF TUBULAR FILM

Filed Oct. 31, 1962

INVENTOR
RICHARD M. SULLIVAN

BY *Herbert M. Wolfson*

ATTORNEY

Nov. 19, 1968    R. M. SULLIVAN    3,412,189
APPARATUS AND PROCESS FOR USE IN THE EXPANSION
OF TUBULAR FILM
Filed Oct. 31, 1962    2 Sheets-Sheet 2

INVENTOR
RICHARD M. SULLIVAN

BY *Herbert M. Wolfson*

ATTORNEY

United States Patent Office 3,412,189
Patented Nov. 19, 1968

3,412,189
APPARATUS AND PROCESS FOR USE IN THE EXPANSION OF TUBULAR FILM
Richard M. Sullivan, Madison, Tenn., assignor to E. I. du Pont de Nemours and Company, Wilmington, Del., a corporation of Delaware
Filed Oct. 31, 1962, Ser. No. 234,397
2 Claims. (Cl. 264—95)

This invention relates to the orientation of thermoplastic polymeric film in tubular form and, specifically, to an improved process and an apparatus for use in the expansion of the tubular film to orient such film.

In U.S. patent application Ser. No. 51,629, filed Aug. 24, 1960, and assigned to the assignee of the present application, is disclosed a continuous process for extruding, quenching and thereafter orienting a thermoplastic polymeric film. Specifically, the continuous process disclosed involves extruding the molten polymer in the form of a tubular sheet; passing the extruded tubular sheet into a quenching zone wherein the sheet is cooled rapidly to a temperature below its formative state; passing a gas into the tubular sheet at a rate sufficient to maintain a pressure within the tubular sheet that prevents collapse while the sheet is relatively cool but that expands the tubular sheet when the sheet is heated to a temperature within the orientation temperature range; and then passing the tubular sheet into a zone wherein the sheet is heated to a temperature within the orientation temperature range whereby the tubular sheet is expanded and thus oriented.

One problem that is apparent in such a process is to prevent the molten tubular sheet, immediately upon extrusion, from being blown away from the quenching apparatus with resulting "blow-outs" or breaks in the continuous tubular sheet. Specifically, the object of the present invention is to provide means for isolating the pressure used for expanding the tubular film when the temperature of the tubular film is within the orientation temperature range from the zone in which the film is still substantially molten, i.e., the film is not form-stable. Other objects will appear hereinafter.

The objects are accomplished by using a special collar around a surface in combination with a pressure relief outlet in said surface, the collar being located between the expansion area downstream thereof and the beginning of the quenching area upstream thereof and the pressure relief outlet being located between the collar and the beginning of the quenching area, the collar being composed of an annular ring having a resilient, pneumatically deformable extension, the extension in its relaxed position making an obtuse angle with the upstream portion of the surface. Any gas from the expansion area that might pass back to the extrusion zone tends to deflect the resilient extension into peripheral contact with the inner surface of the tubing. Thus, the gas will be prevented from flowing back. The invention will be more clearly understood by referring to the following detailed description and the drawing, in which:

Figure 1:
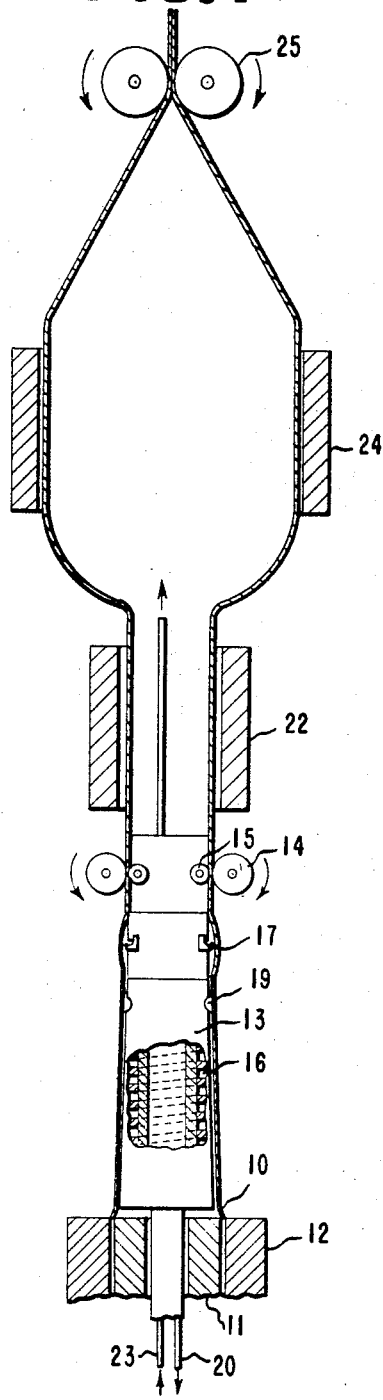
FIGURE 1 illustrates schematically in elevation the apparatus for extruding, quenching, heating and expanding the tubular film.

Referring to FIGURE 1, a polymeric melt issues continuously from the annular die opening (formed between core 11 and lip member 12 of the circular die) as a tubular film 10 and is cooled to a form-stable state by passage over and in contact with internal cooling mandrel 13 of circular cross section. Mandrel 13 is supplied with internal coils or helical passages 16 for the circulation therethrough of coolant. The cooling mandrel 13, preferably fabricated of a highly thermally conductive metal, may be tapered to reduce its cross section in the direction of film advance in order to reduce drag forces occasioned by neck-in and shrinkage of the polymeric tube as it cools. Tubular film 10 is advanced over mandrel 13 by the pull generated at the nips of the film advancer shown as a pair of driven, preferably rubber covered, rolls 14 external to tubular film 10, each of which bears a tangential rolling contact against a cooperating metal idler roll 15 optionally rubber covered and conveniently mounted on an extension of cooling mandrel 13.

Film advancement over the cooling mandrel may be accomplished effectively by a variety of functionally equivalent means including:

(1) The use of four driven rubber covered rolls 14 spaced about mandrel 13 in a square configuration, each cooperating with its respective idler roll 15; or (2) The use of two or more driven rubber covered rolls 14 pressing tubular film 10 directly against the surface of mandrel 13; or (3) The use of three or more driven rubber covered belts external to tubular film 10, each cooperating with a train of idler rolls mounted on an extension of the mandrel as described in U.S. Patent 3,022,928.

Rubber collar 17, shown here as partially deformed by gaseous pressure supplied to the expansion zone is composed of an annular ring having an extension completely around it and usually molded integral with the ring of pneumatically deformable, resilient material. The extended or outwardly projecting portion of the collar provides in its relaxed position an obtuse angle with the upstream surface of the mandrel. The extension may be substantially straight or curved as shown in the figure. When deflected in a generally upstream direction, collar 17 makes peripheral contact with the inside surface of the advancing tubular film 10 and cooperates with the annular pressure relief groove 19. A series of radially extending holes 21 connect annular pressure relief groove 19 to circular manifold 29 which is, in turn, connected to exhaust line 20. Line 20 may be connected to a vacuum system or may optionally lead to the atmosphere. This serves to effectively isolate the weak polymeric melt in the vicinity of the die face from bubble blowing pressures existing downstream from collar 17.

Tubular film 10, by passage trough concentrically positioned cylindrical heater 22 is heated to a temperature in the orientation temperature range, i.e. in the formative state but below its melting temperature range, where, in response to internal gaseous pressure supplied through line 23, it expands until it comes in contact with concentrically positioned quench ring 24, supplied with internal helical passage (not shown) for the circulation therethrough of coolant. Passage through quench ring 24 serves to cool the expanded tubular film 10 to a temperature at which it is again form-stable. The film 10 is then collapsed to a flat tube by bubble-closing, counter-rotating nip rolls 25, from which it is optionally drawn off and wound up as flat tubing or may be slit at both creases and wound up as separate flat plies of film.

Although not shown in FIGURE 1, a heater concentrically positioned within tubular film 10 and mounted on a thermally isolated extension of mandrel 13 may be used effectively, either alone or in cooperation with external heater 22 to reheat tubular film 10. This is shown in application Ser. No. 51,629, referred to previously.

If biaxial orientation of tubular film 10 is intended, nip rolls 25 counter-rotate at a lineal speed greater than the nip rolls of the film advancer. However, if it is not desired to impart longitudinal elongation to the tubular film, they may counter-rotate at the same lineal speed as the rolls of the film advancer. As a matter of fact, nip rolls 25 may, in the absence of film advancing rolls 14 and 15, act alone to provide advancement of the tubular film from the casting die.

Figure 2:
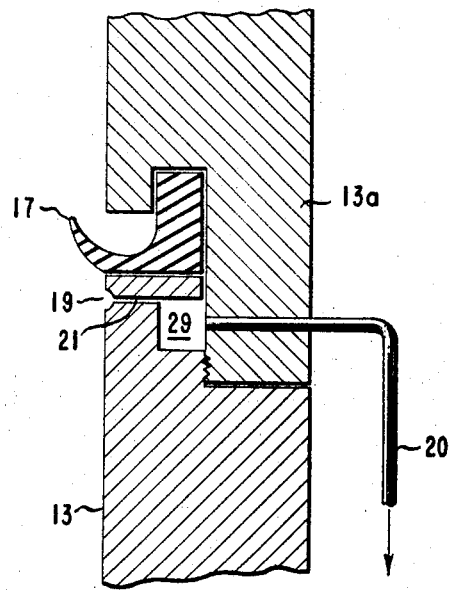
FIGURE 2 is a side elevation of one type of the resilient, deformable collar for use in the present invention.

In FIGURE 2, specially molded rubber collar 17 is held in place by the throttled annular recess formed between mandrel extension 13a and mandrel 13 into which extension 13a is threaded. The effect of a vacuum applied at annular pressure relief groove 19 tends to hold tubular film 10 in peripheral contact with the outermost extension of rubber collar 17, this portion of collar 17 extending radially outward from the mandrel and in a generally downstream direction, i.e. in the direction of travel of tubular film 10 and which portion of collar 17 presents a generally concave appearance or acute angle toward its downstream side, i.e. toward the bubble blowing zone, and a convex appearance or an obtuse angle toward its upstream side.

Should tubular film 10 decrease slightly in diameter while passing over and in peripheral contact with the "lip" portion of rubber collar 17, due perhaps to a momentary increase in haul-off tension, the resiliently deformable collar is capable of flexing inwardly toward the mandrel to accommodate this diametral change.

An increase in gaseous blowing pressure downstream of the mandrel will tend to deflect the lip portion of collar 17 simultaneously outward and in a generally upstream direction, thus insuring the maintenance of peripheral contact with the inner surface of tubular film 10 effective to isolate gaseous bubble blowing pressures downstream therefrom.

Figure 3:
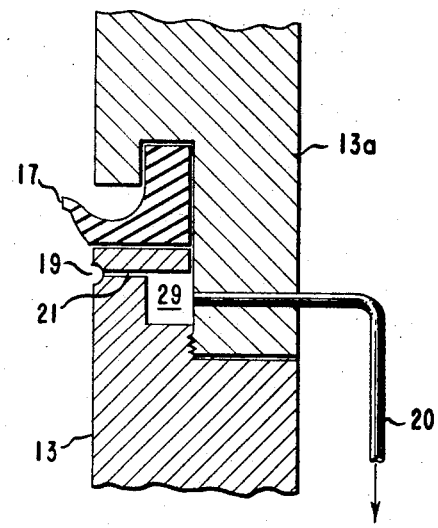
FIGURE 3 is a side elevation of another type of the resilient, deformable collar for use in the present invention.

In FIGURE 3 is illustrated a variation in the design of the rubber collar shown in FIGURE 2 which increases the area of peripheral contact of the collar with the inner surface of tubular film 10.

Figure 4:
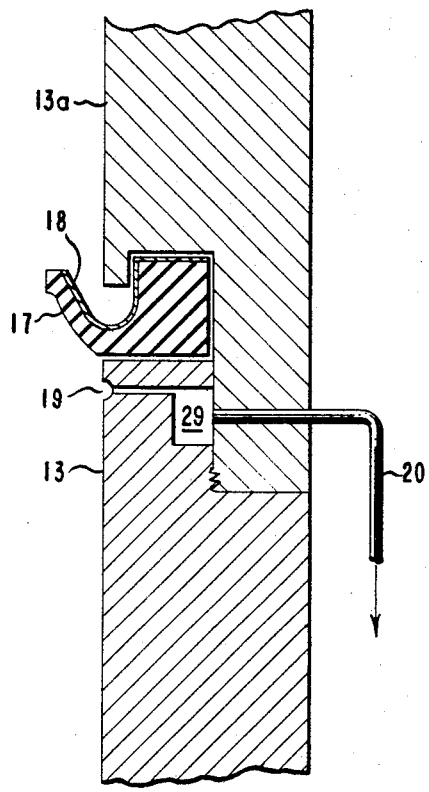
FIGURES 4 and 5 are fragmentary elevation and plan views of a preferred form of the collar.
Figure 5:
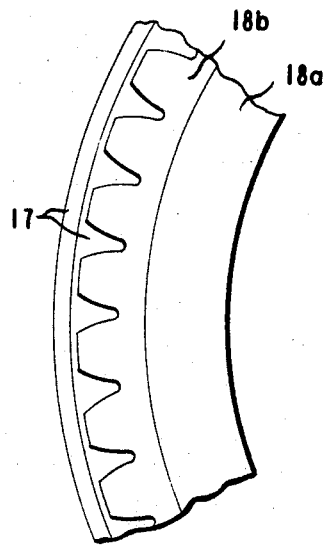

In FIGURES 4 and 5 are illustrated enlarged fragmentary elevation and plan views of a preferred form of the rubber collar shown in FIGURES 2 and 3. Circular spring 18 is retained in place in the throttled recess formed between mandrel 13 and mandrel extension 13a by the elastic recovery forces exerted by the inner portion of rubber collar 17 which was placed under slight compression by the assembly of the mandrel components with spring 18 in place. Circular spring 18, shaped to conform to the generally concave portion of rubber collar 17, is conveniently formed from one piece of spring metal and consists of an inner continuous circular portion 18a and an outer segmented portion 18b. Should tubular film 10 decrease in diameter, the elastic recovery forces in segments 18b will assist the normal resiliency of the lip portion of rubber collar 17 in resisting the compressive force caused by the diametral shrinkage of the tubular film. On the other hand, the fact that no portion of circular spring 18 is bonded to rubber collar 17 assures that the outer lip portion of the latter is free to deflect outwardly and in a generally upstream direction in response to an increase in gaseous bubble blowing pressures downstream therefrom as previously described.

A further advantage of segments 18b is that they may be inelastically deformed by bending them outward to stretch the periphery of the outer lip portion of rubber collar 17 in order to insure uniform peripheral contact of the latter with the inner surface of tubular films of slightly larger diameters than those for which the collar was specifically molded.

The rubber collar of this invention is relatively inexpensive and simple to install. It responds directly to fluctuations in the gaseous pressure in the bubble blowing zone and does not require either an auxiliary source of fluid pressure or signal-responsive control equipment to be effective.

Although the use of this invention has been illustrated in FIGURE 1 which shows the polymeric melt being extruded in an upward direction in a vertically integrated process, the use of the invention is generic as well to horizontally integrated processes and to vertically integrated processes where the polymeric melt is extruded in a downward direction.

If the circular casting die is rotated to randomize gauge imperfections in the tubular film, the mandrel optionally may or may not be rotated with the die. In any situation where the mandrel is rotated and an initial rate of film advancement is provided, two or four idler rolls 15 may be conveniently mounted on a sleeve encircling the mandrel and within which the mandrel is free to rotate by virtue of an array of ball-bearings, the sleeve being held stationary by the pressure of driven rubber covered rolls 14 against idler rolls 15.

Rubber collar 17 and annular pressure relief groove 19 are shown in FIGURE 1 as being located intermediate between the circular die and the film advancer. This is the preferred location for these two components of the invention from the standpoint of convenience in the design of the process equipment. However, the collar and groove may conveniently serve their pressure isolation function if located on an extension of the mandrel downstream from the film advancer.

A wide variety of thermoplastic polymers have been successfully manufactured in the form of tubular films on equipment employing some variation of the invention hereinbefore described. Among these polymers may be mentioned low density branched polyethylene, high density linear polyethylene, blends of branched and linear polyethylenes, isotactic linear polypropylene, polyvinyl chloride, polyvinylidene fluoride, polyamides; copolymers of ethylene with propylene, butene-1, vinyl acetate, ethyl acrylate; linear polyesters including polyethylene terephthalate; copolymers of tetrafluoroethylene with hexafluoropropylene; copolymers of hexafluoropropylene with vinylidene fluoride; and copolymers of vinyl chloride with vinyl acetate.

Because of the many and varied applications in which films of such a wide variety of thermoplastic polymers will be employed, it is inevitable that these polymers, prior to extrusion, will be compounded and blended with an equally wide variety of modifying agents, both organic and inorganic, used singly and in combinations. These will include antioxidants, ultraviolet light screening agents, thermal stabilizers, slip promoting agents, flame retardants, plasticizers (both fugitive and permanent); fillers to impart electrical conductivity, to reduce gloss, to create various color and/or opacity effects or to modify certain physical properties.

In the tubular film manufacturing processes employing this invention, the flexible collar is in continual rubbing contact with the inner film surface. Consequently it must maintain the combination of hardness, resiliency and flexibility designed into it at the time of its manufacture and deemed appropriate to meet the requirements of the specific manufacturing operation despite the continual action thereon of the aforementioned modifying agents which are unavoidably present on the surfaces of the tubular films and which will variously soften or embrittle, abrade or otherwise corrode the collar.

A wide variety of elastomers which may be suitably compounded and molded to withstand the rigors of many a specific manufacturing situation are available. Among these may be mentioned the isoprenes (both natural and synthetic), neoprene, polysulfide rubbers, butadiene/nitrile rubbers, butadiene/styrene rubbers, silicone rubbers, polyurethane rubbers such as those available commercially under the name "Adiprene," * polyacrylate rubbers, polyisobutylene rubbers, and fluoroelastomers such as those available commercially under the name "Viton." *

Employing manufacturing equipment essentially as shown in FIGURE 1 and rubber collars of the types shown ---
*Trademarks of E. I. du Pont de Nemours and Co., Inc.

in FIGURES 2–5, biaxially oriented tubular films were successfully manufactured from a variety of polymers including polyethylene terephthalate, linear high density polyethylene, branched low density polyethylene, blends of low and high density polyethylenes, isotactic linear polypropylene, a variety of linear polyamides, polyvinylidene fluoride, copolymers of tetrafluoroethylene with hexafluoropropylene, copolymers of ethylene with, among others, butene-1, ethyl acrylate and vinyl acetate; polyvinyl chloride and copolymers of vinyl chloride with vinyl acetate.

During these operations, polymers were processed at throughputs ranging from 5 to 250 pounds/hour over tapered cooling mandrels ranging in nominal diameter from 2 to 9 inches at initial rates of advancement ranging from 2.5 to 60 feet/minute and with tubular blowing zone gaseous pressures ranging from 0.5 to 30 inches of water.

This range of gaseous blowing pressures within the tubular film was successfully isolated from the weak polymer melt in the immediate vicinity of the circular casting die through the combined action of subatmospheric pressure acting at the annular pressure relief groove and the peripheral contact of the flexible rubber collar with the inner surface of the tubular film maintained in direct response to changes in gaseous blowing zone pressures.

What is claimed is:

1. An apparatus comprising an extruder; a die communicating with said extruder having an annular orifice through which to extrude thermoplastic material in the form of tubing; a substantially rigid mandrel adapted to receive the tubing around said mandrel and to cool said tubing; means for advancing the tubing over said mandrel; means for supplying a gaseous medium within said tubing to a point downstream from said mandrel; means for preventing said gaseous medium from flowing upstream past said mandrel to said die, said means comprising at least one pressure relief outlet disposed on the surface of the mandrel adapted to vent gas from interior of the tubing in combination with a collar secured to and encircling said mandrel disposed adjacent to and downstream from said pressure relief outlet, said collar being composed of an annular ring having a resiliently deformable extension around the circumference of said ring, the extension in its relaxed position making an obtuse angle with the upstream portion of said mandrel and being adapted to deflect by gas pressure into peripheral contact with the inner surface of said tubing.

2. A process comprising the steps, in sequence, of extruding thermoplastic polymeric material in the form of molten tubing; advancing the tubing over and in contact with the surface of a cooling mandrel; thereafter, advancing the tubing over a resiliently deformable collar projecting from the surface of said mandrel, the projecting collar in its relaxed position making an obtuse angle with the upstream portion of the mandrel; passing a gaseous medium into the interior of said tubing at a point downstream from said mandrel and said collar; deflecting said resilient collar into contact with the inner surface of the tubing; and withdrawing gaseous medium at spaced intervals around the surface of said mandrel at locations adjacent to and upstream from said collar whereby gas is prevented from flowing back to the point of extrusion.

References Cited
UNITED STATES PATENTS

| 3,151,358 | 10/1964 | Gerber | 18—14 |
| 2,472,724 | 6/1949 | Pevney | 34—242 |
| 2,987,767 | 6/1961 | Berry et al. | 18—14 |
| 3,035,302 | 5/1962 | Lysobey | 18—14 |
| 3,084,448 | 4/1963 | Dungler | 34—242 |
| 2,433,937 | 1/1948 | Tornberg | 18—14 |
| 2,492,440 | 12/1949 | Reichel | 34—242 |
| 2,903,743 | 9/1959 | Lysobey | 18—14 |
| 2,987,765 | 6/1961 | Cichelli | 18—14 |
| 3,098,260 | 7/1963 | Richeson | 34—242 |

ROBERT F. WHITE, *Primary Examiner.*

A. R. NOE, *Assistant Examiner.*